May 8, 1956 G. N. DEANE 2,744,391
APPARATUS FOR FREEZING, COOLING BEVERAGES OR COMESTIBLES
Filed Aug. 3, 1951 2 Sheets-Sheet 1
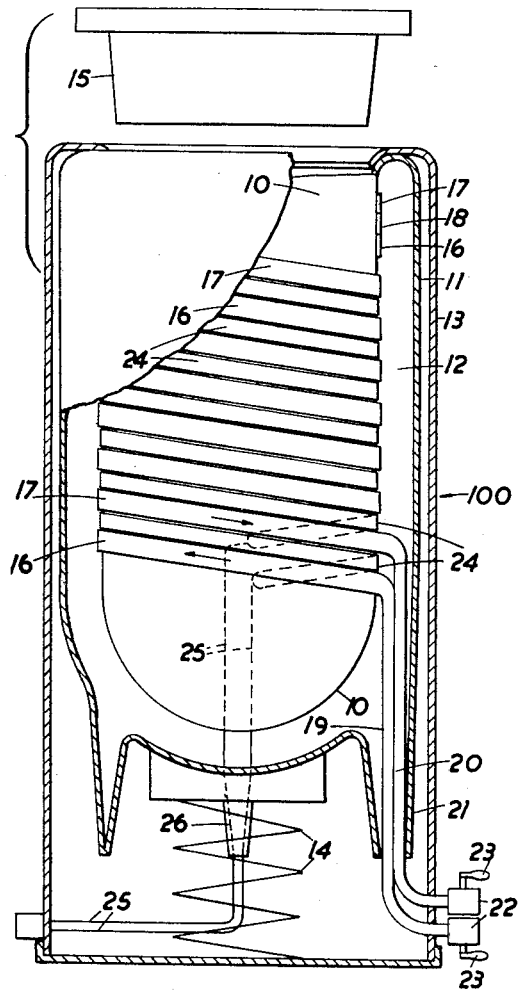
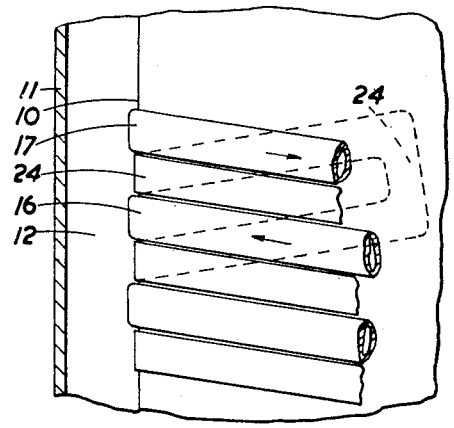
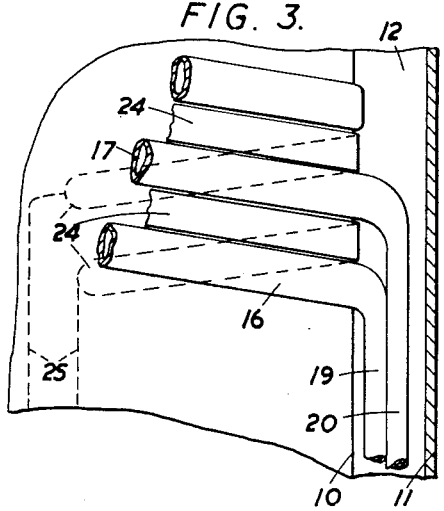
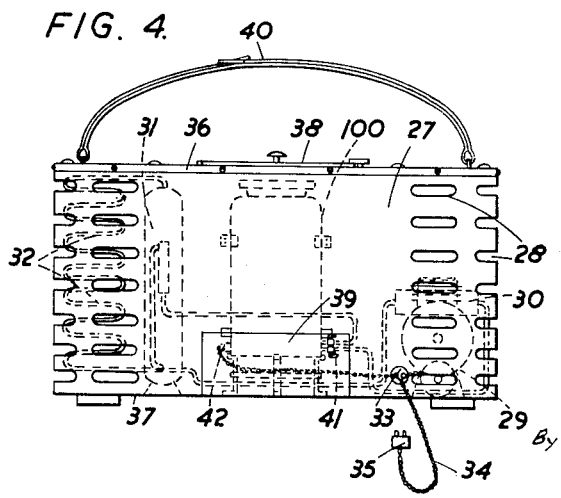
Inventor
Gerald Newenham Deane
By Shoemaker + Mattare
Attorneys May 8, 1956  G. N. DEANE  2,744,391
APPARATUS FOR FREEZING, COOLING BEVERAGES OR COMESTIBLES
Filed Aug. 3, 1951  2 Sheets-Sheet 2
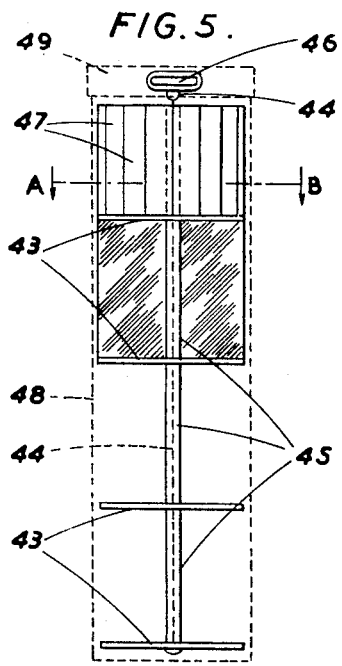
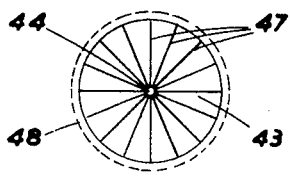
Inventor
Gerald Newenham Deane
By Shoemaker & Mattare
Attorneys United States Patent Office 2,744,391
Patented May 8, 1956

2,744,391
APPARATUS FOR FREEZING, COOLING BEVERAGES OR COMESTIBLES

Gerald Newenham Deane, Buenos Aires, Argentina

Application August 3, 1951, Serial No. 240,132

3 Claims. (Cl. 62—99)

This invention relates to means for use in the production of ice, or for freezing or cooling beverages or comestibles.

It is an object of the invention to provide a rapid acting and relatively inexpensive ice making or ice-cream freezing unit adapted to be operatively associated with a refrigerating apparatus in order quickly and cheaply to freeze ice-cream or to produce ice for cooling drinks or for similar purposes.

Another object of the invention is to provide a freezing unit which shall be such that it may be coupled to the refrigerant circuit of any form of domestic or like refrigerator to increase the ice-making or ice-cream freezing capacity of such refrigerator.

A further object of the invention is to provide a unit which shall be capable of use not only for freezing or cooling purposes, such, for example, as the production of ice, cooling beverages, freezing ice cream, and the freezing or chilling of other articles of food, but also for heating purposes, such for example as boiling or heating beverages, soups or stews or cooking or heating appropriate comestibles, in addition to being capable of use for maintaining a beverage or comestible in a cold or hot condition.

A still further object of the invention is to provide a portable self-contained apparatus for freezing, cooling or heating purposes such as those mentioned above which shall be such as to require only coupling to a supply of electric energy to render it operative.

According to this invention, a freezing unit, for inclusion in, or coupling to, the refrigerant circuit of a refrigerating apparatus, for freezing water, ice-cream or other medium, comprises, in combination, a vessel which receives the medium to be frozen, an evaporating coil surrounding said vessel, means for coupling its ends to appropriate pipes of the refrigerant circuit of the refrigerating apparatus, and means effective to insulate said vessel and coil during freezing of said medium.

In a freezing unit according to the invention the vessel which receives the medium to be frozen is vacuum jacketed, and comprises inner and outer walls with the space between them evacuated, the inner wall constituting the container for the medium to be frozen and having associated with it an evaporating coil which is included in the refrigerant circuit and with which coil the said inner wall is in heat transmitting relation.

A combined freezing or cooling and heating unit according to this invention comprises a vessel or container for the medium to be cooled or heated having inner and outer walls with an evacuated space between them, an evaporating coil for inclusion in the refrigerant circuit of a refrigerating apparatus and disposed in said space in heat exchange relation with the inner wall of said vessel, the turns of said coil being spaced apart, and an electric resistance surrounding the inner wall of said vessel and lying in the spaces between the turns of the evaporating coil, said resistance being disposed in heat transmitting relation with the said inner wall of the vessel and being furnished with leads for connecting it with a supply of electric energy.

A portable self-contained freezing, cooling and heating apparatus according to this invention comprises a carrier, constituted by a perforate casing or cage equipped with a handle or handles, a refrigerant circuit in which is included, in addition to a unit constructed as defined in the preceding paragraph, an expansion chamber for the refrigerant, a condenser therefor and a pump, an electric motor for driving said pump, and a change-over switch for selectively coupling a supply of electric energy to said motor or to the resistance of the aforesaid unit.

In the accompanying drawings:

Fig. 1 illustrates largely in vertical section, a unit, according to an embodiment of the invention, for use for freezing or cooling and for heating beverages or comestibles.

Figs. 2 and 3 are fragmentary views, partly sectional, illustrating to a larger scale than Fig. 1 portions of the unit shown in that figure, said portions being located respectively near the top and bottom of the vessel or container for the medium being treated in the unit.

Fig. 4 shows in elevation a portable self-contained freezing or cooling and heating apparatus constituting an embodiment of the invention, a unit as shown in Figs. 1, 2 and 3 and the other parts enclosed by the casing being shown in dotted outline.

Fig. 5 shows in sectional elevation a means according to the invention adapted to be disposed in a freezing unit to divide the frozen contents into a number of blocks, and Fig. 6 is a sectional plan of the means shown in Fig. 5, the section being taken on the line A—B of that figure.

Referring firstly to Figs. 1, 2 and 3, the unit 100 therein illustrated comprises a vacuum-jacketed vessel 10 constituting a container for the medium under treatment, the vessel 10 being enclosed by and spaced from an outer wall 11 with the space 12 between the walls evacuated in known manner. This double-walled vacuum jacketed vessel, which is mounted in the nature of a vacuum flask or jar, is in a protective casing 13 of metal, plastic or other appropriate material, and resiliently held in position therein by a coil spring 14 in the manner conventional in vacuum flasks. 15 is a stopper of cork or other appropriate material for closing the mouth of the vessel 10.

Associated with the vessel 10 is an evaporating element for inclusion in the refrigerant circuit of a refrigerating apparatus, the element shown comprising intertwined flow and return helical coils 16, 17 connected at 18 at their upper ends, near the top of the vessel 10, the turns of the coils being spaced apart. The double coil thus produced is formed of glass tubing, preferably of flattened section as shown, and preferably is fused to the outer side of the wall of the vessel 10. If desired, the tubing may be square, circular or other shape in cross section. Instead of fusing the coil 16, 17, 18 to the wall of the vessel 10 it may snugly embrace the latter in heat exchange relation therewith. In this case, the coil may be sprung around said wall to ensure the maintenance of the requisite close contact therewith, the coil at the same time being able to adjust itself to variations in diameter of the vessel due to expansion and contraction, thus avoiding fracture of the coil in the event of excessive expansion of the vessel diametrally thereof.

The inlet and outlet end portions 19, 20 of the tubing constituting the evaporator coil 16, 17, 18 are carried in an air-tight manner through the outer wall 11 of the double-walled vessel, preferably by fusing the said end portions together and to a spigot 21 at the bottom of said wall 11, thereby also sealing the end of the spigot. These end portions 19, 20 of the evaporator coil extend through the wall of the casing 13 to the outside thereof where they are equipped with valves 22 having associated couplings for connecting them to the appropriate pipes of the refrigerant circuit of the refrigerating apparatus.

The valves prevent loss of refrigerant when the coil is disconnected from the said pipes, and preferably are combined or interlocked with the couplings in any known or convenient manner such as will prevent the coil being uncoupled except when the valves are closed. The handles 23 of the valves 22 are shown in Fig. 1 suitable metallic reinforcement may be provided on the glass tubing where it passes through the wall of the casing 13, such reinforcement extending to the couplings associated with the valves 22, or, alternatively, the glass tubing may terminate within the casing 13 and its ends be sealed to short portions of metallic tubing which pass through the casing wall for connection to the couplings.

Instead of the evaporator tubing being in the form of helical coils it may be fashioned to provide around the wall 10 a number of vertically or horizontally disposed spaced runs or reaches joined as requisite by return bends in such manner as to connect all the said runs or reaches in series.

To minimise radiation losses the glass tubing constituting the evaporator may be mirrored, e. g. silvered on the side remote from the vertical centre line of the vessel and thus from the contents of the vessel. Where the unit is for use only for freezing or cooling, the wall 10 of the vessel at the spaces between the turns of the glass tube coil, or the runs or reaches of tubing, would be silvered or otherwise mirrored in the manner usual in vacuum flasks.

As already mentioned herein, there may be combined with the freezing or cooling unit described means for heating a medium in the container constituted by the inner wall 10 of the double-walled vessel. In the embodiment of the invention illustrated in Figs. 1, 2 and 3, of the drawings, 24 is an electric resistance lying snugly against the outer surface of the wall 10 of the vessel, in the spaces between the turns of the cooling coil 16, 17, 18, such resistance being constituted by a strip of tin foil or thin tinned plate.

The resistance is furnished with leads 25 carried in an air-tight manner through the outer wall 11 of the vessel. Conveniently the lead wires 25 may pass through, and be sealed in, a spigot 26 on the wall 11, as shown in Fig. 1. If desired, the heating resistance may be applied to the bottom and lower portion of the wall 10 of the vessel in addition to embracing the major portion of said wall.

The glass cooling coil 16, 17, 18 may be mirrored by spraying the appropriate portion of its surface with mercury, or by securing tin-foil to such portion of its surface, or in any other convenient manner. Instead of the cooling coil being formed of a glass tube, it may be constituted by a metal tube of any appropriate shape in cross section, but preferably flattened.

If desired, the double walled vessel 10, 11 may be formed of metal, in which case the resistance 24 constituting the heating element would be suitably insulated from the walls of the vessel.

Whether the double walled vessel 10, 11 be of glass or metal appropriate means would be provided to prevent or minimize loss of heat by radiation from the heating element to the outer wall 11 of the vessel. Owing to the space between the inner and outer walls of the vessel being evacuated, transmission of heat by convection from the heating element 24 to the outer wall 11 of the vessel, and its resultant loss, will not obtain.

It will be appreciated that this invention enables a double-walled vacuum jacketed vessel of given size to be equipped with an evaporating coil and a heating element without increasing or materially increasing the spacing apart of the inner and outer walls of the vessel or the overall size of the vessel.

A combined freezing or cooling and heating unit constructed according to the embodiment of the invention described may be incorporated in a portable self-contained freezing or cooling and heating apparatus. Such an apparatus is illustrated in Fig. 4 by way of example conveniently it comprises, as shown, an elongated casing 27 of metal, plastic or appropriate material having its end slotted or apertured at 28 to provide access for atmospheric air to the interior of the casing. In one end region of the casing 27 there is mounted a small electric motor 29 drivingly coupled to a refrigerant circulating pump 30 and in the other end region there is arranged an expansion chamber or vessel 31 and a condenser coil or grid 32.

Also provided in the casing 27 is the necessary piping forming with the pump expansion chamber, condenser coil and evaporating or cooling coil, the complete refrigerant circuit. Between the motor driven pump and the expansion chamber and condenser the freezing or cooling and heating unit 100 is disposed with its evaporating coil (not shown) included in the refrigerant circuit and its heating element (not shown) suitably coupled to a change-over switch 33. Also connected to the change-over switch 33 is the pump operating motor 29, and the arrangement is such that either the heating element or the motor may be rendered operative, but not both. A cut out switch may be provided, or the change-over switch may have a cut-out position. A lead-in cable 34 is connected to the switch 33, said cable being furnished with a plug 35 for connecting it to any appropriate source of supply, for example the electric circuit of a motor vehicle.

If desired, the motor 29 of the portable unit or apparatus may be arranged to drive a fan (not shown) to circulate air through the casing 27 to cool the motor and condenser and enhance the cooling effect of the latter.

The casing 27 has its top 36 or bottom 37 removably secured, e. g. by screws or bolts, to its side wall or walls, and also has openings to afford access to the double walled vessel 10, 11 and to the internal wiring of the apparatus, these access openings being closed by hinged doors 38, 39. For carrying the unit it is furnished with a handle. A strap handle 40 is shown attached to the top 36 of the casing, but the handle may be of any appropriate kind and be attached to any convenient part of the casing.

The refrigerant and electric circuits preferably include suitable couplings 41, 42 disposed adjacent or on the casing 1 of the double walled vessel 10, 11 constituting the cooling and heating unit 100 to enable such unit to be detached from these circuits and permit its removal from the casing 27. Thus any convenient type of coupling members each equipped with a shut off valve as described in the case of the couplings 22, Fig. 1 may be incorporated in the refrigerant circuit, and the lead wires to the heating resistance may terminate in a plug co-operating with a socket on the casing 13.

There may be associated with the refrigerant circuit any suitable relief valve to prevent the pressure in the circuit rising above a pre-determined figure when the heater is in use, thus reducing the risk of bursting of the cooling coil.

If desired there may be mounted in the container or vessel 10 when used for freezing water or other liquid readily removable means such that the contents of the vessel will be frozen into a number of separate blocks, or into a single block readily severable into smaller blocks. Thus, there may be provided, for insertion in the vessel or liquid container 10, Fig. 1, the multiple tray assembly illustrated in Figs. 5 and 6, such assembly consisting of a number of circular plates or discs 43, constituting trays threaded on a rod 44 and spaced by tubes 45, the upper end of the rod 44 being threaded and equipped with a removable handle 46 for lifting the assembly out of the vessel 10. If desired, the spacing tubes 45, or the trays 43, may be equipped with radial wings or partitions such that the contents of the vessel will be frozen into sector shaped blocks. For example, one tray, as shown the upper tray, may have associated with it a relatively large number of wings 47 so that wedge shaped pieces of ice will be formed, and another tray, as shown the second tray, have four such wings or partitions whereby quadrant shaped pieces of ice will be formed. Conveniently and usually the multiple tray assembly will be disposed in a separate canister or container 48, equipped with a lid or cover 49, and adapted to be placed in the vessel 10, Fig. 1, of the freezing unit, and be readily removable therefrom.

As already indicated, the invention is not restricted to apparatus wherein both a cooling or freezing coil and a heating resistance are associated with the double-walled vessel as the heating resistance may be omitted. Alternatively, two vacuum jacketed vessels may be employed, one equipped with a freezing or refrigerating coil and the other with a heating coil, in which case the aforementioned change-over switch would be operated to bring into service the coil appropriate to the vessel to be used.

It will be understood that whether the apparatus comprises a single vacuum jacketed vessel or the twin vessels set forth in the last preceding paragraph, the provision of the cooling coil in the evacuated space between the walls of the vessel constitutes the essential feature of the invention.

The invention provides a cooling or freezing unit which may be coupled to the refrigerant circuit of an existing refrigerator to increase the capacity of the latter.

Where the cooling or freezing unit is detachable from the apparatus comprising the remainder of the refrigerating circuit, any appropriate means may be provided for making good any loss of refrigerant due to leakage at the couplings, or, after the unit has been disconnected from the circuit, at the valves associated with the couplings. Conveniently the valves may be utilised to charge a predetermined quantity of refrigerant into the refrigerating circuit when requisite.

While the aforementioned silvering of the cooling coil and the inner wall of the vacuum jacketed vessel is primarily intended to minimise radiation losses, the silvering will also be of advantage in aiding conductivity as it will constitute a vehicle for assisting thermal exchange between the glass tubing of the coil and the inner wall of the vessel, it being understood that glass tends to resist the passage of heat.

What I claim is:

1. A cooling unit, for use in the production of ice or in freezing or cooling beverages or comestibles, comprising, in combination, a vessel receiving the medium to be cooled, said vessel having inner and outer walls spaced apart with the space between such walls evacuated, an evaporating coil formed of glass tubing surrounding and fused to the inner wall of said vessel with its end portions extending through and fused to the outer wall of the vessel, said coil being spaced apart from the inner surface of said outer wall and having its outer surface at its side remote from the medium in the vessel mirrored to minimise radiation losses, and means for connecting the ends of said coil to pipes included in a refrigerant circuit, the evacuated space between the walls of the vessel insulating the inner wall of said vessel and said coil against the transmission of heat thereto from outside the outer wall of the vessel.

2. A cooling unit, for use in the production of ice or in freezing or cooling beverages or comestibles, comprising, in combination, a vessel receiving the medium to be cooled, said vessel having inner and outer walls spaced apart with the space between such walls evacuated, an evaporating coil formed of glass tubing surrounding the inner wall of said vessel in intimate physical contact therewith and with its end portions extending through the outer wall of said vessel and sealed thereto against the inflow of air into the space between the walls of the vessel where the tubing passed through said outer wall, said coil being spaced apart from the inner surface of said outer wall and having its outer surface at its side remote from the medium in the vessel spaced a substantial distance from the outer wall and mirrored to minimise radiation losses, and means for connecting the ends of said coil to pipes included in a refrigerant circuit, the evacuated space between the walls of the vessel insulating the inner wall of said vessel and said coil against the transmission of heat thereto from outside the outer wall of the vessel.

3. A cooling unit, for use in the production of ice or in freezing or cooling beverages or comestibles, comprising, a vessel receiving the medium to be cooled, said vessel having inner and outer walls spaced apart with the space between such walls evacuated, an evaporating coil formed of glass tubing surrounding and fused to the inner wall of said vessel with its end portions extending through the outer wall of the vessel, and means for connecting the end portions of said coil to pipes included in a refrigerant circuit, the evacuated space between the walls of the vessel insulating the inner wall of said vessel and said coil against the transmission of heat thereto from outside the outer wall of the vessel.

References Cited in the file of this patent

UNITED STATES PATENTS

| Number | Name | Date |
|---|---|---|
| 1,166,623 | Myers | Jan. 4, 1916 |
| 1,451,376 | Smith | Apr. 10, 1923 |
| 1,991,784 | Bohemier | Feb. 19, 1935 |
| 2,138,885 | Ross | Dec. 6, 1938 |
| 2,160,184 | Wilhelm | May 30, 1939 |
| 2,209,099 | Grueneklee | July 23, 1940 |
| 2,352,581 | Wilhelm | June 27, 1944 |
| 2,404,972 | Mallard | July 30, 1946 |
| 2,449,127 | Kleist | Sept. 14, 1948 |
| 2,472,362 | Barnebey et al. | June 7, 1949 |
| 2,521,064 | Kleist | Sept. 5, 1950 |

FOREIGN PATENTS

| 475,438 | Canada | July 24, 1951 |